US006546189B1

(12) United States Patent  
Koda

(10) Patent No.: US 6,546,189 B1
(45) Date of Patent: Apr. 8, 2003

(54) METHOD AND APPARATUS FOR EDITING COMPRESSED MOVING PICTURES AND STORAGE MEDIUM

(75) Inventor: Eriko Koda, Kawasaki (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/299,746

(22) Filed: Apr. 27, 1999

Related U.S. Application Data

(60) Provisional application No. 60/046,821, filed on Nov. 15, 1996.

(30) Foreign Application Priority Data

Apr. 28, 1998 (JP) .............................. 10-118129

(51) Int. Cl.$^7$ .............................. H04N 5/93; H04N 5/91
(52) U.S. Cl. ........................................... 386/52; 386/55
(58) Field of Search .................. 386/52, 55, 53, 386/46, 4, 1, 95; 360/13; 369/83; H04N 5/93, 5/91

(56) References Cited

U.S. PATENT DOCUMENTS 5,237,648 A * 8/1993 Mills et al.
5,568,275 A * 10/1996 Norton et al.
5,621,536 A * 4/1997 Kizu

FOREIGN PATENT DOCUMENTS

JP          A-9-247620        * 9/1997

* cited by examiner

Primary Examiner—Robert Chevalier
(74) Attorney, Agent, or Firm—Antonelli, Terry, Stout & Kraus, LLP

(57) ABSTRACT

When extraction start and end compressed pictures are specified from compressed moving picture data of MPEG (Moving Picture Experts Group) standard, a picture block is fixed which has compressed pictures arranged in the order of displaying with those start and end pictures selected for the opposite ends of the block. If the bidirectional prediction or previous prediction compressed pictures within the picture block have a picture to be required to expand by referring to an outside intraframe compressed picture and/or a previous prediction compressed picture that are out of the picture block, the outside prediction picture to be used for the expansion is added to the compressed pictures within the picture block to produce the range of data being edited. That is, at the time of editing the range of the picture block is changed so that the reference to outside data can be completed within the picture block in a closed manner.

22 Claims, 9 Drawing Sheets

METHOD AND APPARATUS FOR EDITING COMPRESSED MOVING PICTURES AND STORAGE MEDIUM

BACKGROUND OF THE INVENTION

The present invention generally relates to fields of editing compressed moving pictures, and particularly to an editing method and apparatus capable of automatically extracting a part of compressed moving picture data in order that the start and end points of the part can be respectively made as near to those specified for editing by a user as possible.

Moving pictures that are effective as means for transmitting information have much more amounts of information than still pictures, and thus it has been difficult to directly treat them on computer as they are. However, recently MPEG (Moving Picture Experts Group) prescribed in the international standard ISO 11172 has been developed to provide a high compression ratio as a technique for compression of moving pictures, and the secondary storage device has become inexpensive, thus making it possible to treat moving pictures on home computer.

After the first specification MPEG1 was published, a broadcasting compression specification called MPEG2 was established. In MPEG1, pictures transferred at about 1.5 Mbps are reproduced at a rate of about 30 (NTSC) or 25 (PAL) frames per second with a resolution of about 352× 240. In MPEG2, pictures transferred at about 4.0 to 8.0 Mbps are reproduced with a resolution of about 720×480.

MPEG data is normally produced when the analog video images supplied from a camera or capture board are compressed (encoded) in a form of MPEG. The captured MPEG data can be reproduced on a PC (personal computer) having an MPEG decoder (software or hardware) installed.

When MPEG data is captured, it is desired that the captured data be not used as it is, but partially deleted or effectively paste picture to picture as is usual AVI data. However, since MPEG data is in a differentially compressed form as described below, it is very difficult to edit unlike the ordinary digital video.

As to MPEG data, an MPEG video stream as compressed video data and an MPEG audio stream as compressed audio data are multiplexed to form an MPEG system stream. General MPEG data is the MPEG system stream. Only the MPEG video stream or MPEG audio stream as MPEG data can also be reproduced by a soft decoder or the like.

When MPEG data is edited, it is particularly crucial to treat the video stream. The video stream has a hierarchical structure of data. The highest level of this structure is the video sequence. This sequence is formed of a sequence header, one or more GOPs (Group Of Picture), and a sequence end. Each GOP includes one or more pictures (corresponding to frames).

There are three kinds of picture: intra-picture compressed picture (hereinafter, referred to as I picture), previous prediction compressed picture (hereinafter, referred to as P picture), and bidirectional predictive compressed picture (as B picture). As to I picture, each picture is divided into books of 16×16 pixels each, and discrete cosine transform (DCT) is performed within each block, thereby centering video information into coefficients of low frequency components. In addition, those values are quantized considering that human eyes are insensitive to high frequency components. The compressed information through these two processes is further encoded by use of Huffman table.

As to P picture, pictures are differentially compressed by reference to the previous I picture or P picture. First, the picture to be compressed is divided into macro blocks each having 16×16 pixels. Each block selects one of the processes, i.e., intra-block compression, differential compression and no compressed data (skipped). When the previous block relative to the block being compressed is equal to the motion compensation vector, that block can be skipped over the compression data. The differential compression is to compensate the blocks of picture being compressed for the motion relative to the reference picture, determining a motion compensation vector. The intrablock compression is to make the above-mentioned DCT within the block, thereby compressing it.

As to B picture, differential compression is performed by reference to an I picture or P picture located previous on a time basis and a P picture located behind on a time basis. As in the P picture, the picture being compressed is divided into blocks of 16×16 pixels each. Each block selects one of the processes, i.e., intra-block compression, differential compression and no compression (skipped). The way to select is the same as in P picture. Thus, high-efficiency compression can be carried out by using the interpicture differential compression.

The moving picture data compressed by the above method, and compressed audio data are multiplexed for each unit called packet to form MPEG data.

Since the video data within the MPEG are the differentially compressed data obtained by reference to each other as described above, each picture cannot be separated in a compressed form, and thus it is not easy to edit.

A countermeasure against this problem is proposed in JP-A-9-247620. According to this example, since MPEG data is differentially compressed data of each GOP unit, a user (editor) makes cutting out (editing) with ease by specifying mark-in (edition start point) and mark-out (edition end point) on a GOP (Group Of Picture) basis.

SUMMARY OF THE INVENTION

According to MPEG, GOP may include one or more I pictures the number of which is particularly not limited. The number of pictures within GOP in NTSC is generally fifteen (0.5 second), and sometimes all pictures are included in one GOP. In the system of JP-A-9-247620, since all pictures are included in the same GOP, cutting out (editing) is impossible. As the number of pictures within one GOP increases, MPEG data is extracted at a position separated from the range that is specified as mark-in and mark-out by the user.

In order to solve this problem, it can be considered to edit for each picture. In this method, since editing is made for each picture, moving picture data for edition can be extracted from a necessary minimum range. However, when a B picture is designated for mark-in or mark-out, it is always to be decoded and re-encoded so that it can be extracted in a reproducible form even if there is no previous or following picture. Therefore, it takes a longer time than in the editing for each GOP.

It is an object of the invention to provide an editing method and apparatus capable of automatically extracting a part of compressed moving picture data in order that the start and end points of the part can be respectively made as near to those specified for editing by user as possible.

The present invention achieves the above object in such a way as described below. In a method and apparatus for editing moving picture data by use of an editing engine, when a picture to be specified for the editing start position is encoded by referring to another picture out of the editing range, the start position is changed to that referenced I picture or I picture after the start position. In addition, when a picture to be specified for the editing end position is encoded by referring to another picture out of the editing range, the end position is changed to a position including or not-including that reference picture. This method needs no decoding and re-encoding process when editing is performed, and thus makes it possible to reduce the time taken to edit.

Moreover, when the MPEG data to be edited is an MPEG system stream, the editing start and end positions of the audio stream data are changed with the change of those of the video stream. Accordingly, the video stream can be prevented from becoming out of synchronism with the audio stream when the editing positions for the video stream are changed, with the result that the editing process can be properly conducted.

In addition, the editing start and end positions can be specified according to the editing position designation guide information indicated on a display. This guide information enables the pictures to be specified and edited more adequately.

DETAILED DESCRIPTION OF THE EMBODIMENTS

Figure 1:
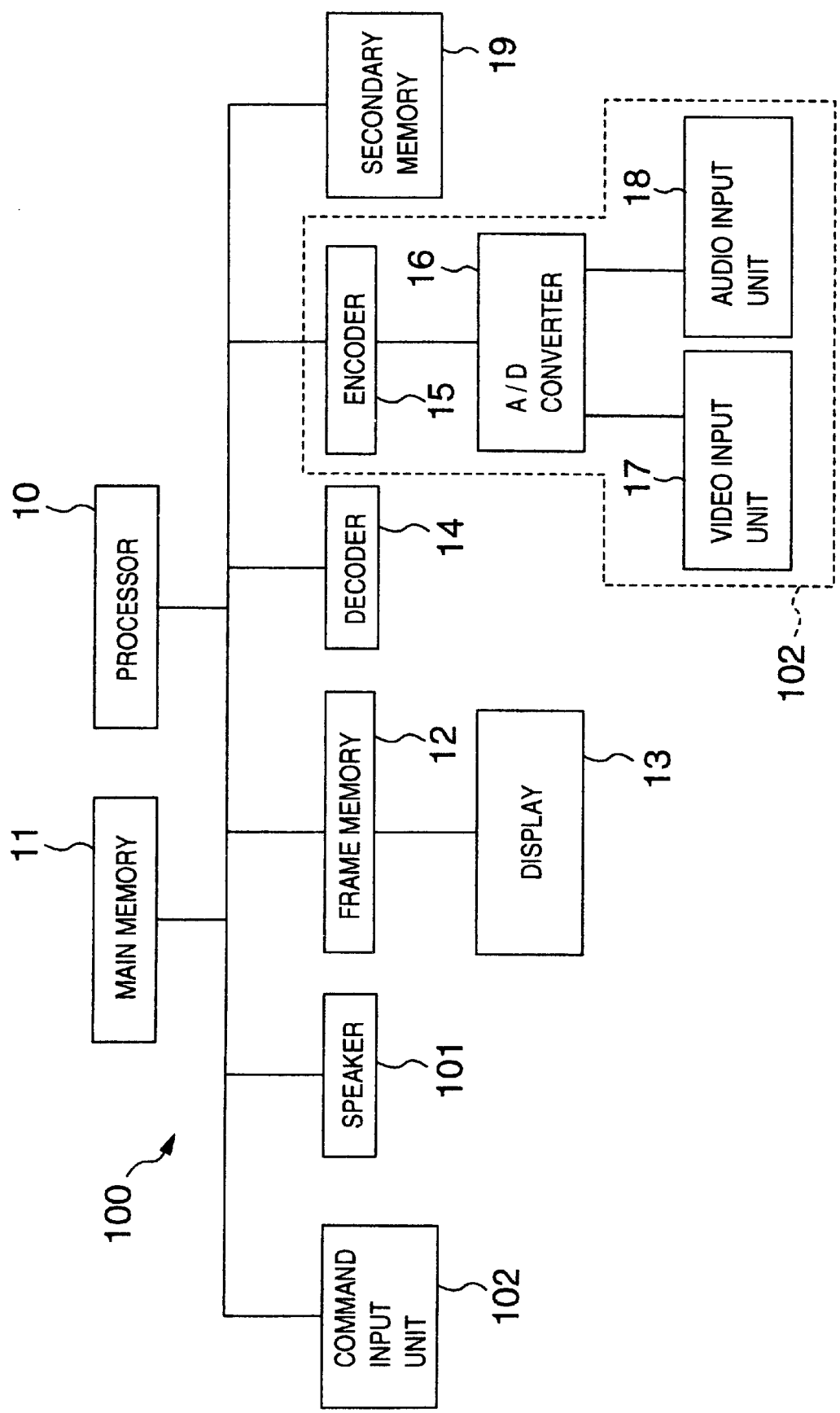
FIG. 1 is a block diagram showing a system for achieving one embodiment of the invention.

FIG. 1 is a block diagram showing a hardware structure of a moving picture compression system of one embodiment of the invention.

Referring to FIG. 1, a compressed moving picture editing system 100 of this embodiment includes a processor 10 for controlling each unit, a main memory 11 for storing video data, an editing program for making different kinds of editing processes on moving pictures, and an editing data table for use in executing the editing program, a frame memory 12 for temporarily storing video data being displayed, a display 13 for indicating decoded video data, a decoder 14 for expanding the compressed data, an encoder 15 for compressing video data and audio data, an A/D converter 16 for converting analog video data and audio data into digital data, a video input unit 17 for receiving analog video data, an audio input unit 18 for receiving analog audio data, a secondary memory 19 for storing the decoded data and the editing program, a speaker 101 as an audio output device, and a command input unit 102 for receiving various kinds of commands and instructions.

The processor 10 reads and takes in the editing program from the main memory 11, and it executes the commands of the editing program to function as an editor.

The analog video and audio signals captured by the video input unit 17 and audio input unit 18 are separately converted into digital signals by the A/D converter 16, and fed to the encoder 15. The encoder 15 compresses these digital signals and produces the compressed data in a form of MPEG system stream.

The MPEG data produced from the encoder 15 is stored in the secondary memory 19 or main memory 11. When the present invention is applied to a compressed moving picture editing system, a block 102 enclosed by the broken line can be omitted from the system 100 shown in FIG. 1.

When the compressed moving picture data stored in the secondary memory 19 or main memory 11 is requested to reproduce by the user, it is expanded by the decoder 14. The expanded video data is written in the frame memory 12, and indicated on the display 13. The audio data expanded by the decoder 14 is reproduced through the speaker 101.

The command input unit 102 is used to select various kinds of processes such as cutting or pasting of data, or specify editing positions such as the extraction start and end positions. This command input unit may be a mouse or keyboard. The information of designated editing positions is stored in the editing data table of the main memory 11. Although the editing data table may be provided on the main memory 11, it can be stored in a cache memory or on other recording media though not shown.

If an input file to be edited, for example, stored in the secondary memory 19 is specified as video data, the input file data is stored in the main memory 11 and edited according to different kinds of processes by the processor 10.

The editing program in this embodiment is executed by the editing apparatus capable of making some editing operations. The editing operations of this kind may include cutting or pasting operation for cutting a part away from an input file or input stream and using it with another file, fading, blending, morphing, tilting, and sticking between audio data and moving picture data.

Figure 8:
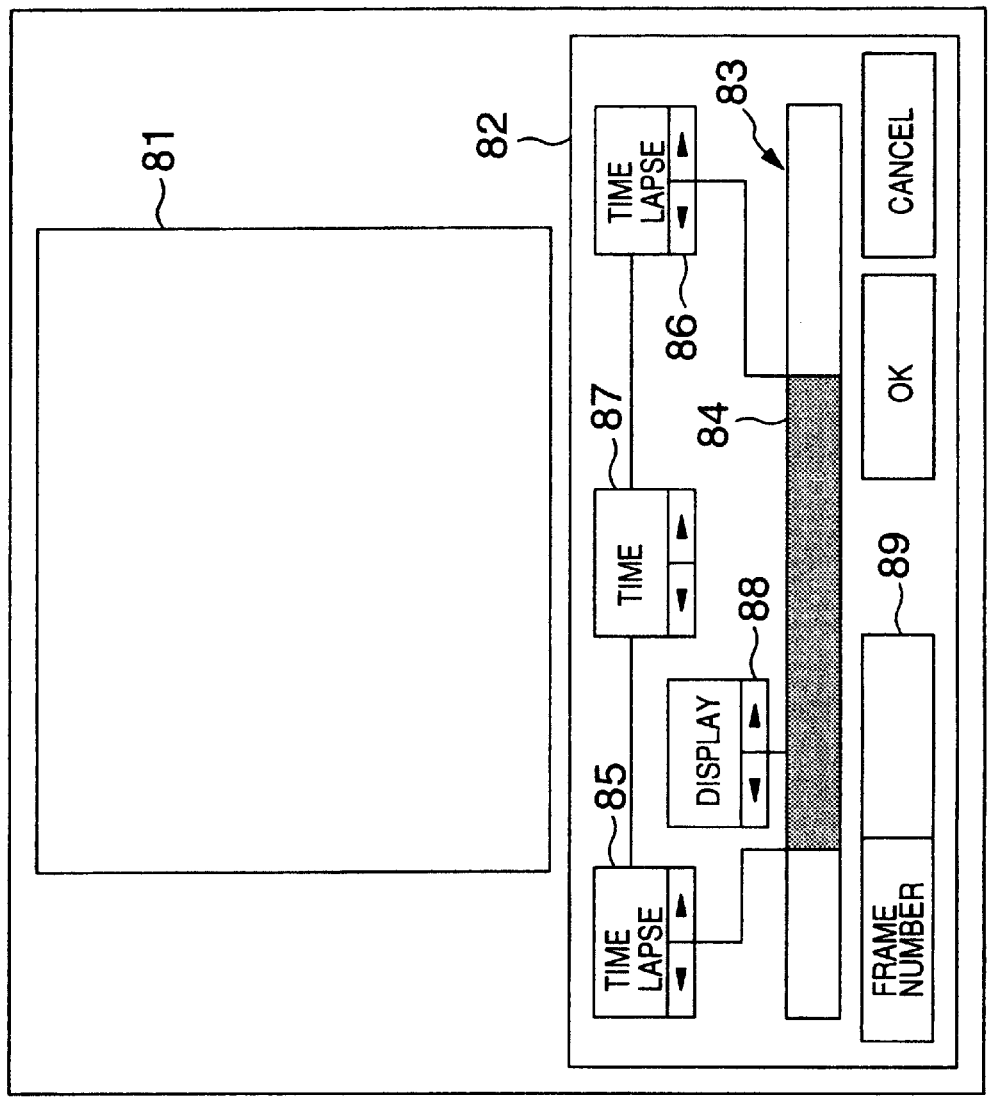
FIG. 8 is a diagram showing an example of the display screen on which the information for specifying the mark-in, mark-out is indicated.

FIG. 8 shows an example of the display for indicating the editing position guide information for use in specifying editing positions. Referring to FIG. 8, there are shown a display area 81 for displaying one frame of picture, and an input area 82 for use in specifying editing positions and changing the position of picture to be displayed.

In addition, there are shown all video data 83, data 84 being cut out, and an area 85 for indicating the mark-in position designated as the extraction start position at which the extraction is to be started. This area indicates the time from the start of video data to the mark-in. There are also shown an area 86 for indicating the mark-out position designated as the extraction end position at which the extraction is to end, or the time from the start of video data to the mark-out, an area 87 for indicating the length of data being cut away, and an area 88 for indicating an image to be displayed on the display area 81.

A desired picture can be selected by aligning the mouse cursor on each of the arrow buttons in the areas 85 through 88 and by clicking the mouse button to adjust the picture position. Thus, when a desired picture can be displayed on the display area 81, the mouse cursor is placed on the OK button, and the mouse button is clicked, thereby making it possible to designate the mark-in and mark-out positions. Alternatively, this designation can be performed by dragging the area 84 being cut off by the mouse or by directly inputting a frame number for the desired mark-in and mark-out into the frame number input area 89.

Figure 2:
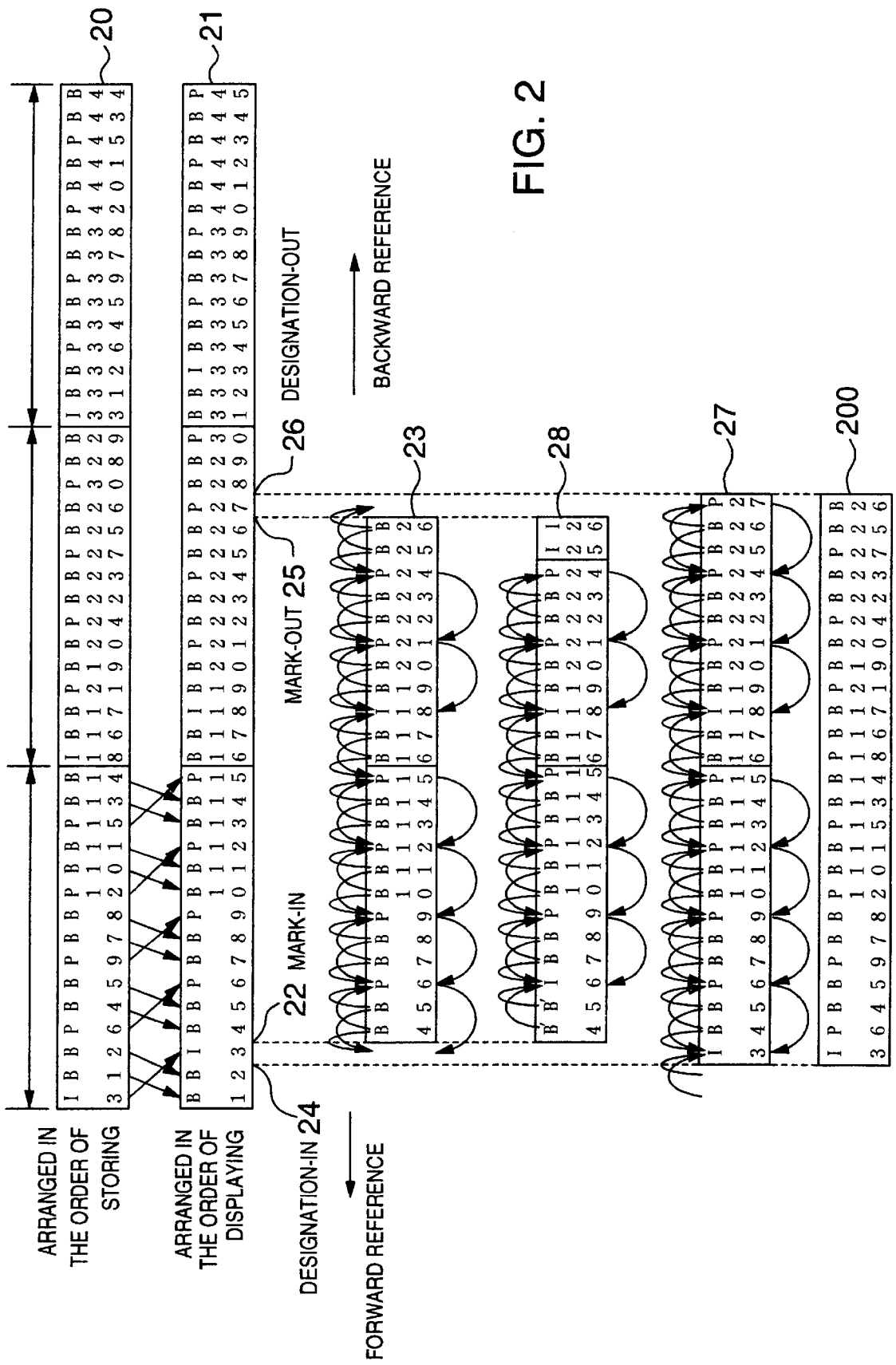
FIG. 2 shows an example of edited picture rows to which reference is made in explaining one embodiment of the invention.

The structure of MPEG data and an example of edition will be described with reference to FIG. 2.

A sequentially stored data row or train 20 indicates the order of pictures in which the MPEG data is stored in the secondary memory 19 or main memory 11. A sequentially displayed data train 21 indicates the order of pictures in which the data decoded by the decoder 14 is displayed in the frame memory. In MPEG, since there are B pictures compressed by bidirectional predictive coding, two reference pictures (I or P picture) necessary for the B pictures to be decoded are stored before the B pictures as seen in the data train 20. This is a desirable way because it can remove the need to hold picture data by an additional buffer when the B picture is encoded or decoded. Therefore, the principle of the invention is that the data stored on media as shown in the sequentially stored data 20 is imaginarily rearranged in the order of displaying as shown in the sequentially displayed data 21.

The editing method of this embodiment will be described with reference to the sequentially displayed data 21. The user operates the editor shown in FIG. 8, specifying mark-in 22 and mark-out 25 in the sequentially displayed data 21. Here, the mark-in indicates the picture at the extraction start position, and the mark-out is the picture at the extraction end position. When the extraction range is defined by the mark-in 22 and mark-out 25, the pictures to be extracted is a picture train of MPEG data 23. However, when the extraction is performed at these positions, the data cannot be correctly decoded because the B4, B5 pictures are produced by reference to the I3 picture. In addition, because the P6 picture is encoded by reference to the I3 picture, correct decoding cannot be expected.

Moreover, as to the B16 through B26 pictures to be extracted from the GOP2, the B25, B26 pictures are encoded by reference to the following P27 picture. Thus, decoding is not correctly made.

In order to correctly decode the data within the range defined by the specified mark-in 22 and mark-out 25, it is necessary, as shown in the MPEG data 28, that the P6 picture be changed to the I6 picture that does not depend on the reference to the previous I3 picture, that the pictures B4, B5 be changed to pictures B4', B5' that refer to picture I6, and that the B25, B26 pictures be changed to the I25, I26 pictures that do not depend on the reference to the P27 picture. Thus, when the extraction is made in the middle of picture sequence as specified, some pictures must be re-encoded in order to make correct decoding.

Figure 3:
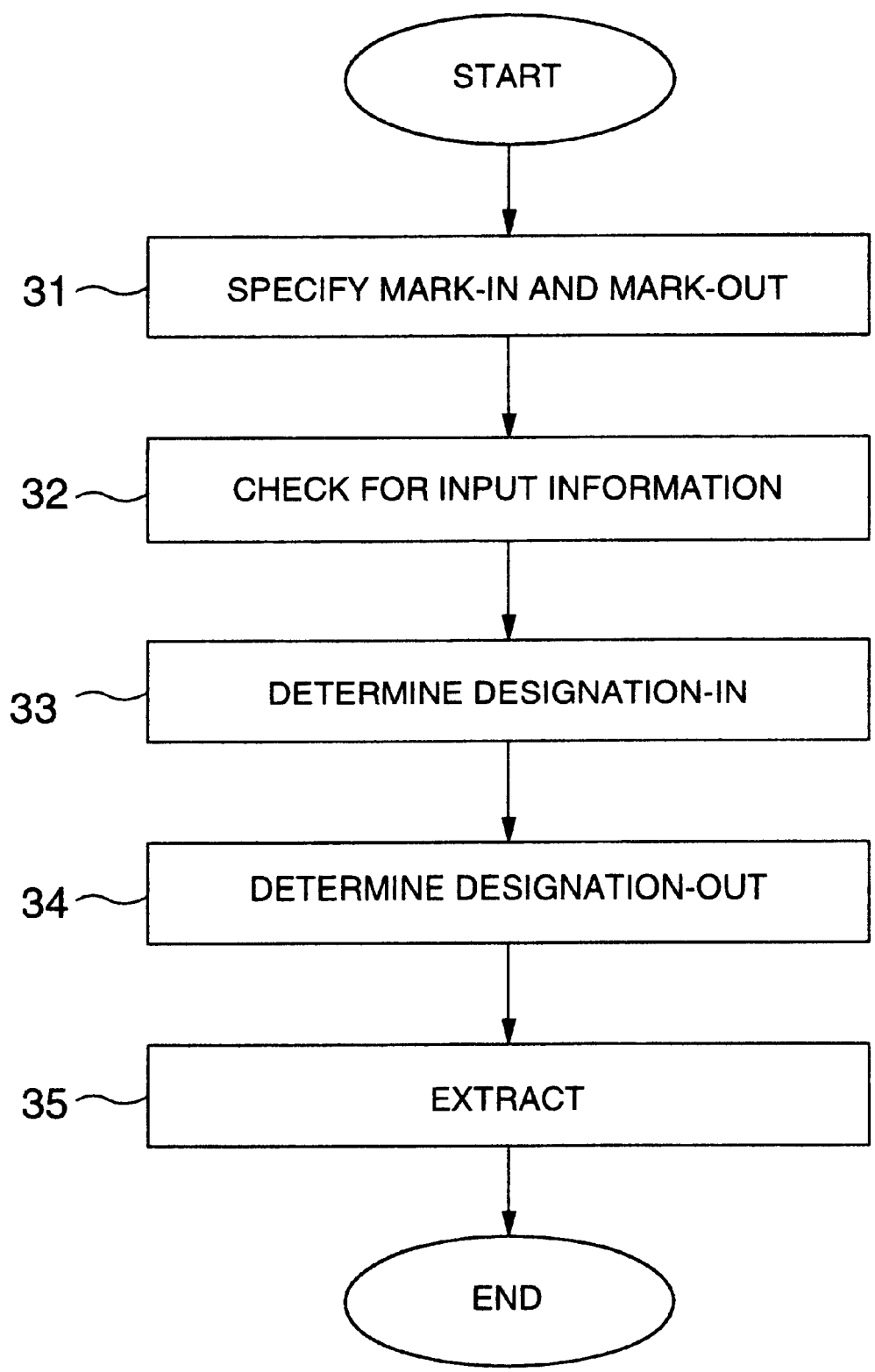
FIG. 3 is a flowchart showing the outline of the editing operation according to the invention.

According to the invention, by the processes shown in FIG. 3 and the following figures, it is possible to automatically modify the mark-in 22 and mark-out 25 and extract without re-encoding as MPEG data 27. In practice, the pictures to be extracted are selected and read from the stored data sequence 20. The read pictures, when used as a file, are arranged in the stored order and stored as a data train 200.

FIG. 3 is a flowchart to which reference is made in explaining all the process of this embodiment.

Figure 9:
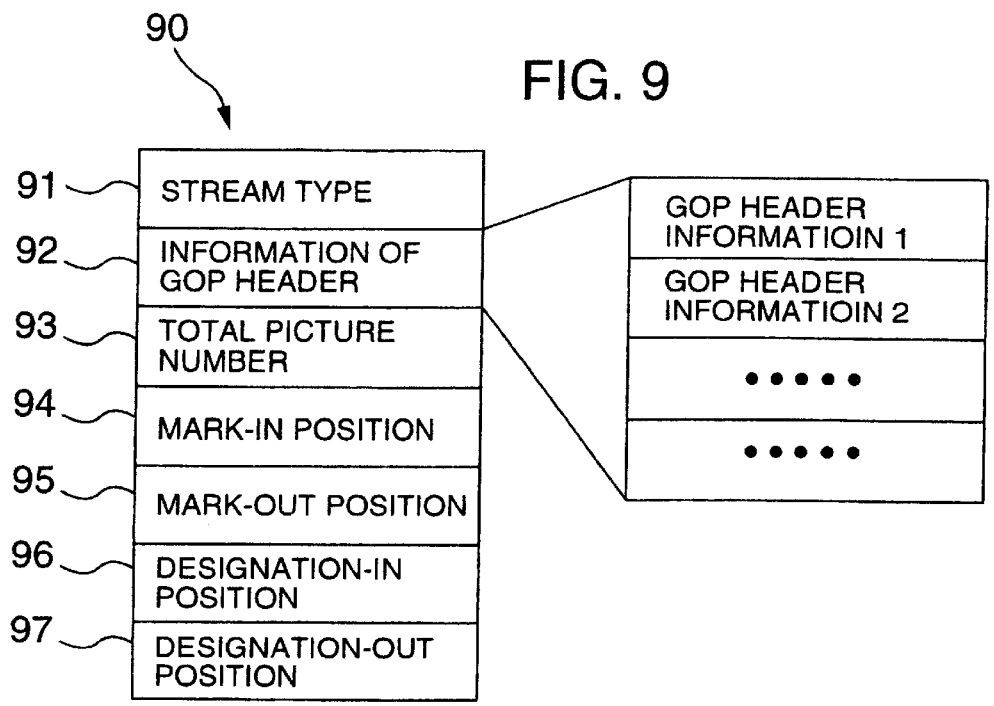
FIG. 9 shows an editing data table for storing various kinds of information necessary for the edition.

When the process is started, at step 31 the user specifies the mark-in 22 and mark-out 25, and the information is stored in a mark-in area 94 and mark-out area 95 of an editing data table 90 shown in FIG. 9. At step 32, it is checked if the input information of the specified mark-in 22 and mark-out 25 are correct. At steps 33 and 34, positions of designation-in 24 and designation-out 26 where the extraction is actually performed are determined. At step 35, the compressed moving picture date is extracted, and then the process ends.

The steps 32 and 33 will be described in detail with reference to FIGS. 4, 5 and 10.

Figure 4:
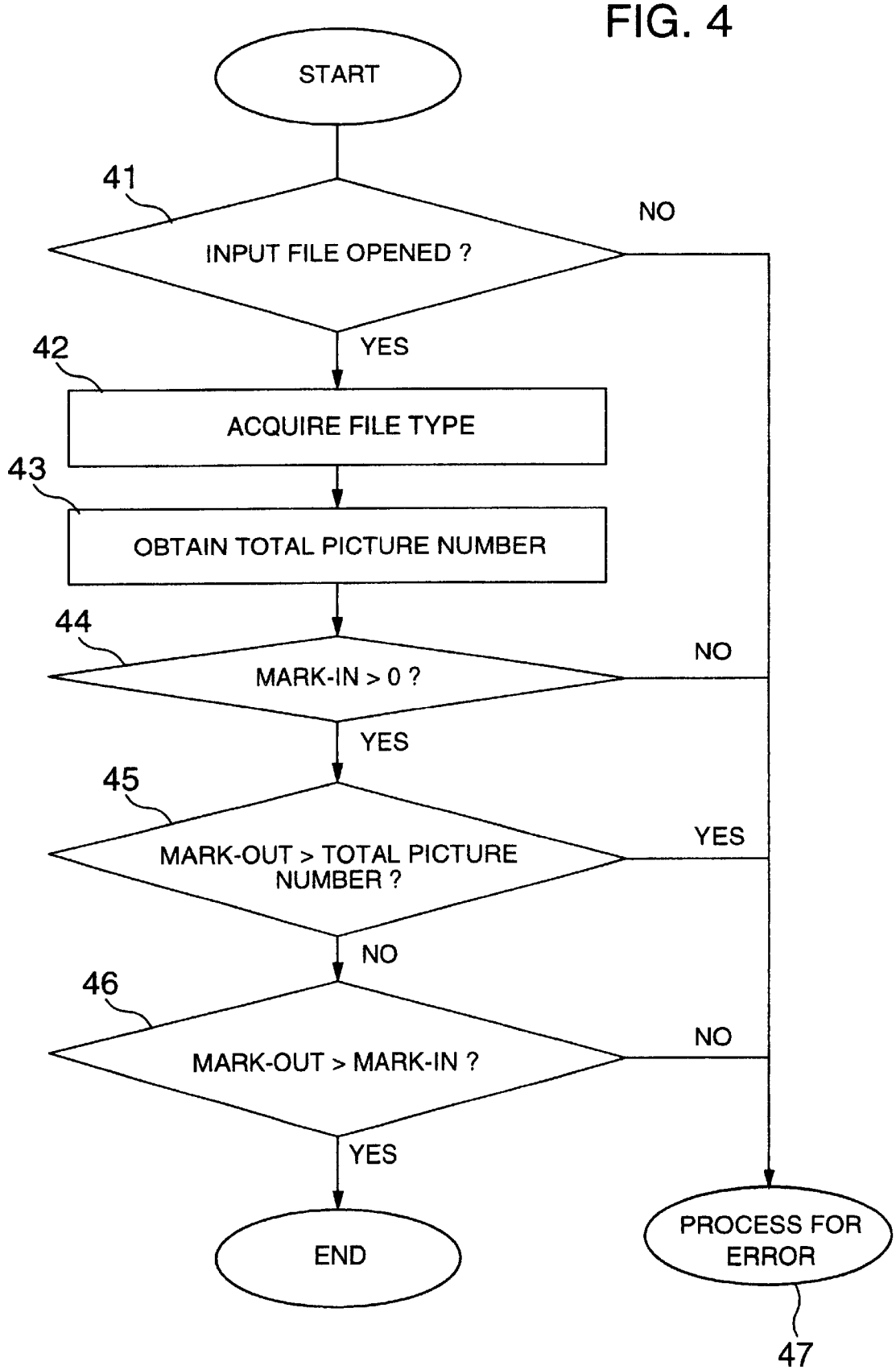
FIG. 4 is a flowchart showing the mark-in, mark-out checking process of FIG. 3.

FIG. 4 is a flowchart to which reference is made in explaining the process from the acquisition of input file information to the checking of the input information for specifying the mark-in 22 and mark-out 25.

At step 41, it is checked if a specified input file being edited that is stored in the secondary memory 19 can be opened. If it cannot be opened, the program goes to step 47 where error processing is made.

If the input file can be opened, the program goes to step 42 where it is confirmed that the input file is an MPEG system stream or MPEG video stream, and the corresponding file type or format is stored in a stream type area 91 of the editing data memory 90 shown in FIG. 9. If the head of the input file is packed header, the file is the system stream. If it is sequence header, the file is the video stream. At step 43, the header information of each GOP included in all video sequence of the stream are sequentially stored in a GOP header information storage area 92. The total number of pictures in the input file is counted by use of the time code (TC) included therein, and stored in a total picture number area 93 of the editing data table shown in FIG. 9. In this embodiment, it is assumed that the total number of pictures is 1500.

At step 44, it is checked if the value of mark-in 22 is larger than 0. When the mark-in is specified, the time from the head of the video sequence is estimated by use of the TC stored in the GOP header information to which the picture belongs, and then where the picture is located from the first of the GOP is detected from the TR (Temporal Reference) of the picture header. That value is estimated from the picture header information. In this embodiment, since the mark-in 22 is the fourth B4 picture, the decision at step 44 is yes. The information is stored in a mark-in position area 94 (in FIG. 9).

At step 45, decision is made of if the value of mark-out 25 is smaller than the total number of pictures as in the case of mark-in 22. In this embodiment, since the mark-out is 26, or smaller than 1500, the decision is No. Thus, the value of mark-out 25 is stored in a mark-out position area 95 (FIG. 9).

If the decision at step 45 is No, the program goes to step 46, where it is checked if the mark-out 25 is larger than the mark-in 22 by use of the values stored in the mark position area 94 and mark-out position area 95 of FIG. 9. Here, since the mark-in 22 is smaller than the mark-out 25, the program goes to the next steps 33 and 34.

If the decision is Yes, the program goes to step 47, where waiting is made for correct input file, mark-in 22, or mark-out 25 to be inputted. Then, the program goes back to step 40. In this way, it can be checked if the mark-in 22 and mark-out 25 have been specified correctly.

Figure 5:
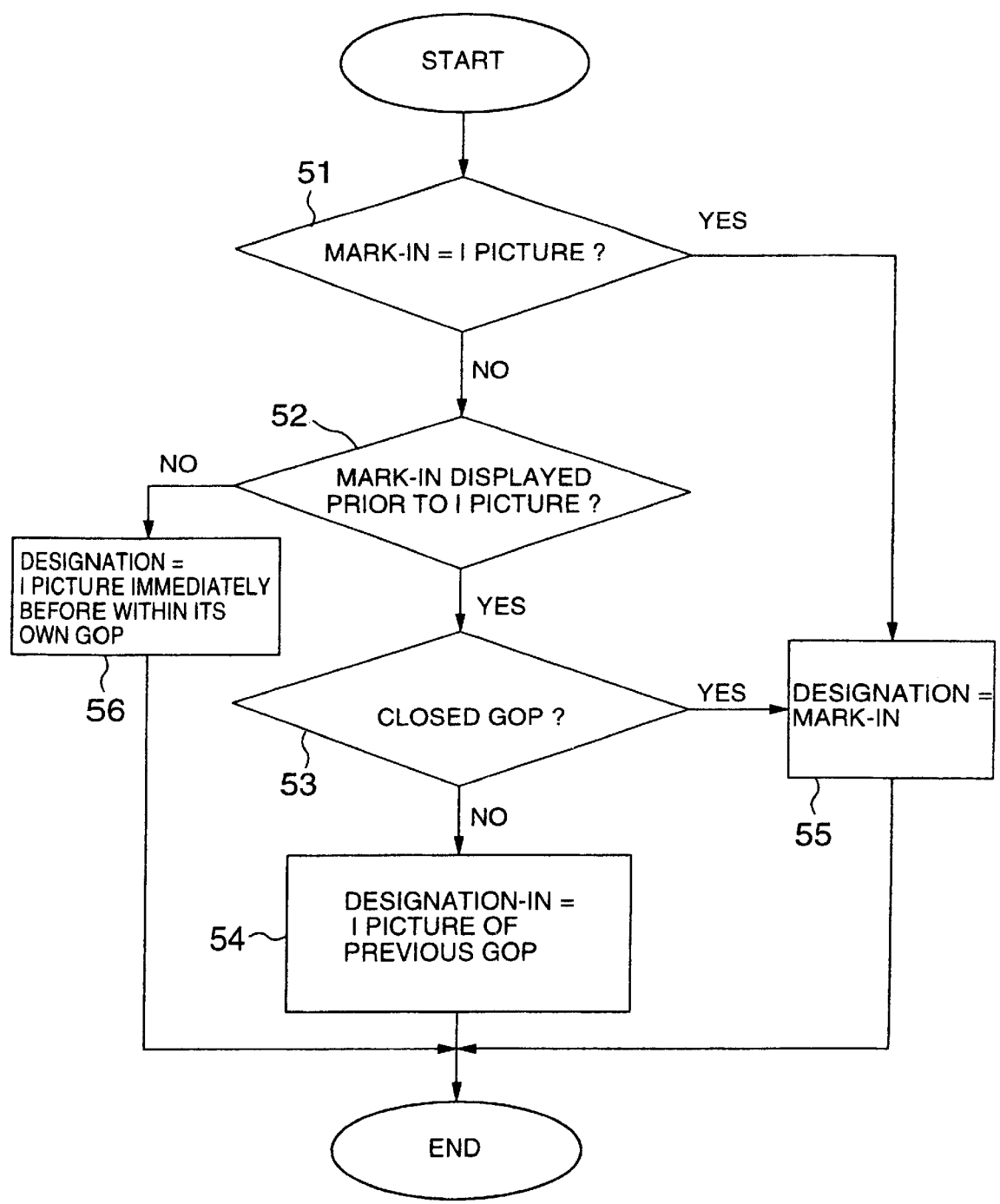
FIG. 5 is a flowchart showing the designation-in determining process of FIG. 3.
Figure 10:
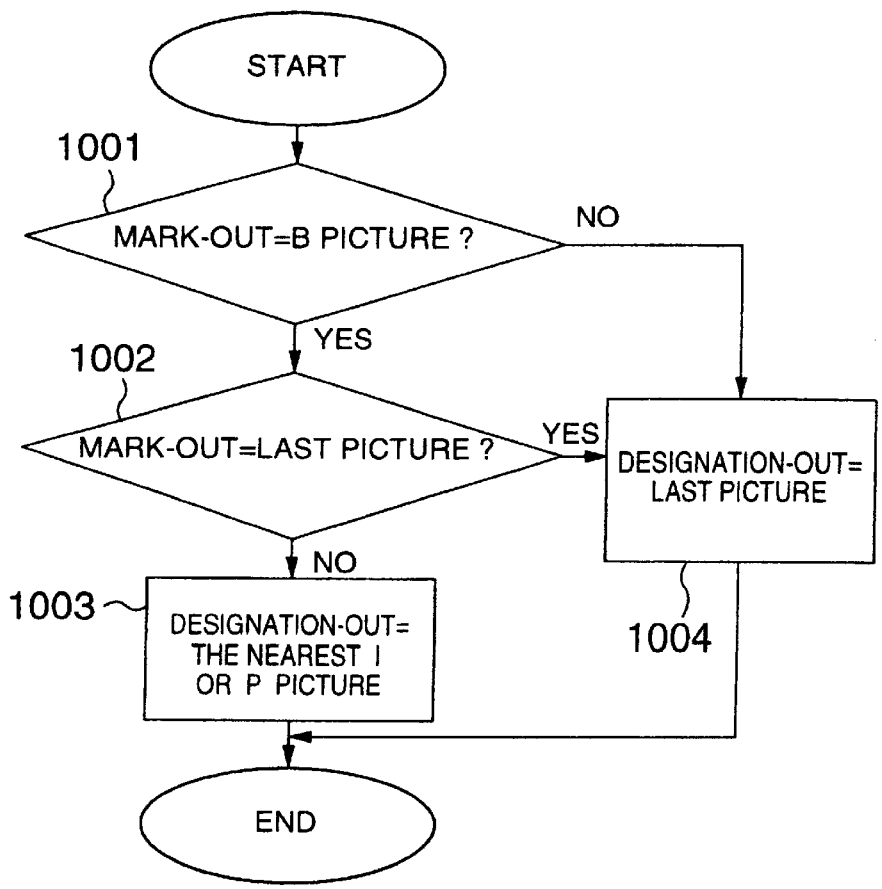
FIG. 10 is a flowchart showing the process for determining the designation-out.

FIGS. 5 and 10 are flowcharts for the detailed steps 32 and 33, respectively. Here, description will be made of the process in which the mark-in 22 and mark-out 25 are changed in their positions and designation-in 24 and designation-out 26 are determined in order to make it possible to edit without re-encoding.

Referring to FIG. 5, at step 51 decision is made of if the picture at the mark-in position is I picture. The kind of picture can be decided from the PCT (Picture Coding Type) of the picture header stored in the mark-in picture information. If the decision is I picture, or Yes, there is no need to change the specified mark-in position since the mark-in picture is not encoded through the reference to the previous picture. Thus, the program goes to step 55, where the designation-in 24 is decided to equal the mark-in 22. The fixed designation-in 24 information is stored in a designation-in position area 96 of the editing data table shown in FIG. 9.

If the picture at the mark-in is P picture or B picture, the program goes to step 52. At step 52, the GOP head information is searched in the editing data table, and from the information of the GOP to which the specified mark-in picture belongs decision is made of if the specified mark-in picture is displayed faster than the first I picture within the GOP associated with that picture. This decision is made by referring to the GOP header information 92 (FIG. 9) and the picture header information 98 (FIG. 9). Alternatively, it is made by referring to the previously produced previous and following GOP information.

Figure 6:
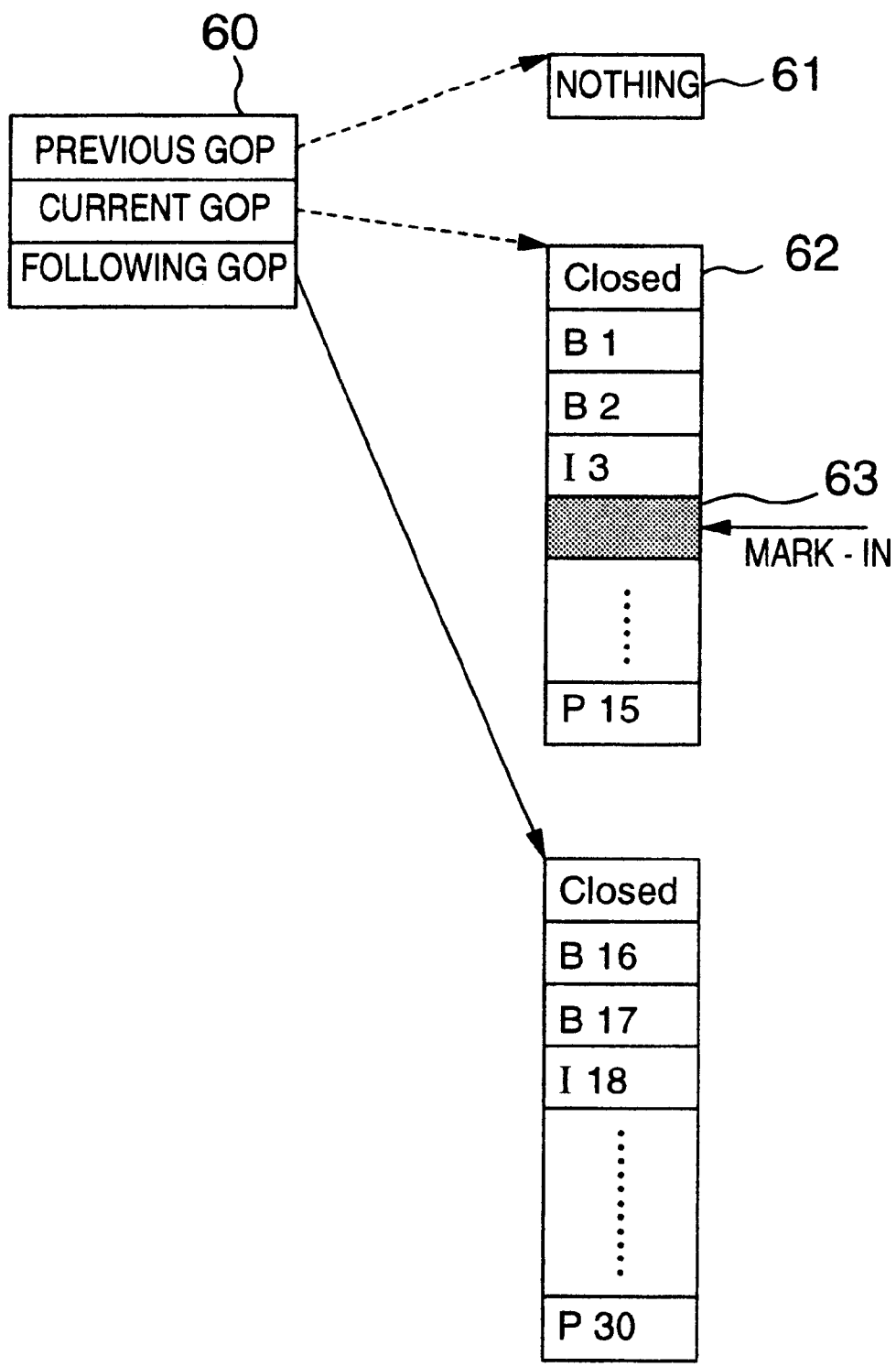
FIG. 6 is a diagram showing information for the designation-in of FIG. 5.

FIG. 6 shows an example of the previous and following GOP information at the mark-in.

In FIG. 6, there is shown a field 60 containing the previous GOP, current GOP and following GOP at the mark-in, which hold sequentially displayed picture information 61, 62 and 63, respectively. Since there is no previous GOP corresponding to GOP1 in this embodiment, the associated information is not present as shown in the field 61. The current GOP, or field 62 has one flag (CG) of the GOP header showing that the GOP at the mark-in is a closed GOP. Here, the CG (Closed GOP) is the flag showing that the pictures within the GOP are not encoded through the process of referring to the previous GOP pictures.

In addition, the B4 picture 63 specified by the mark-in is the fourth in the display order before which the I3 picture lies. Thus, by using the previous and following GOP information, decision is made of if the specified mark-in picture is located in the display order before the I picture existing within the GOP that includes the specified mark-in picture.

Referring back to FIG. 5, at step 52 if the specified mark-in picture is located in the display order before the first I picture of its own GOP, or if the decision is Yes, the program goes to step 53, where decision is made of if the GOP is the closed GOP from the field 62. If it is the closed GOP, the program goes to step 55, where the mark-in picture is fixed to the designation-in 24.

If the GOP of the mark-in picture is not the closed GOP, or if the decision is No, the program goes to step 54, where the last I picture included in the previous GOP is made equal to the designation-in by referring to the header information of the previous GOP in the GOP header information area. Alternatively, the first I picture in the current GOP may be selected as designation-in.

At step 52 if the specified mark-in picture is located in the display order after the first I picture of its own GOP, or if the decision is No, the program goes to step 56. At step 56, the designation-in is fixed to the I picture immediately before the mark-in within the GOP to which that picture belongs by referring to the GOP header information. In this embodiment, since the mark-in picture (B4) is decided to lie after the I3 picture within the GOP1 including the mark-in by referring to the previous and following GOP information, the program goes from step 52 to step 56, where the I3 picture is made equal to designation-in 24.

After the picture of designation-in is decided by the above process, the program goes to the designation-out determining process.

FIG. 10 is a flowchart for the designation-out determining process.

First, at step 1001, decision is made of if the specified mark-out picture is a B picture. In this case, the PCT is referred to in the same way as in the mark-in picture. If the specified mark-out picture is I or P picture, or if the decision is No, the program goes to step 1004, where the mark-out picture is made coincident with the designation-out 26. The fixed designation-out 26 information is stored in a designation-out position area 97 of the editing data table 90 of FIG. 9.

If the mark-out is a B picture, or if the decision is Yes, the program goes to step 1002, where decision is made of if the mark-out 25 is the last picture by referring to the GOP header information 92 (FIG. 9). Alternatively, it may be decided by use of the previously produced previous and following GOP information.

Figure 7:
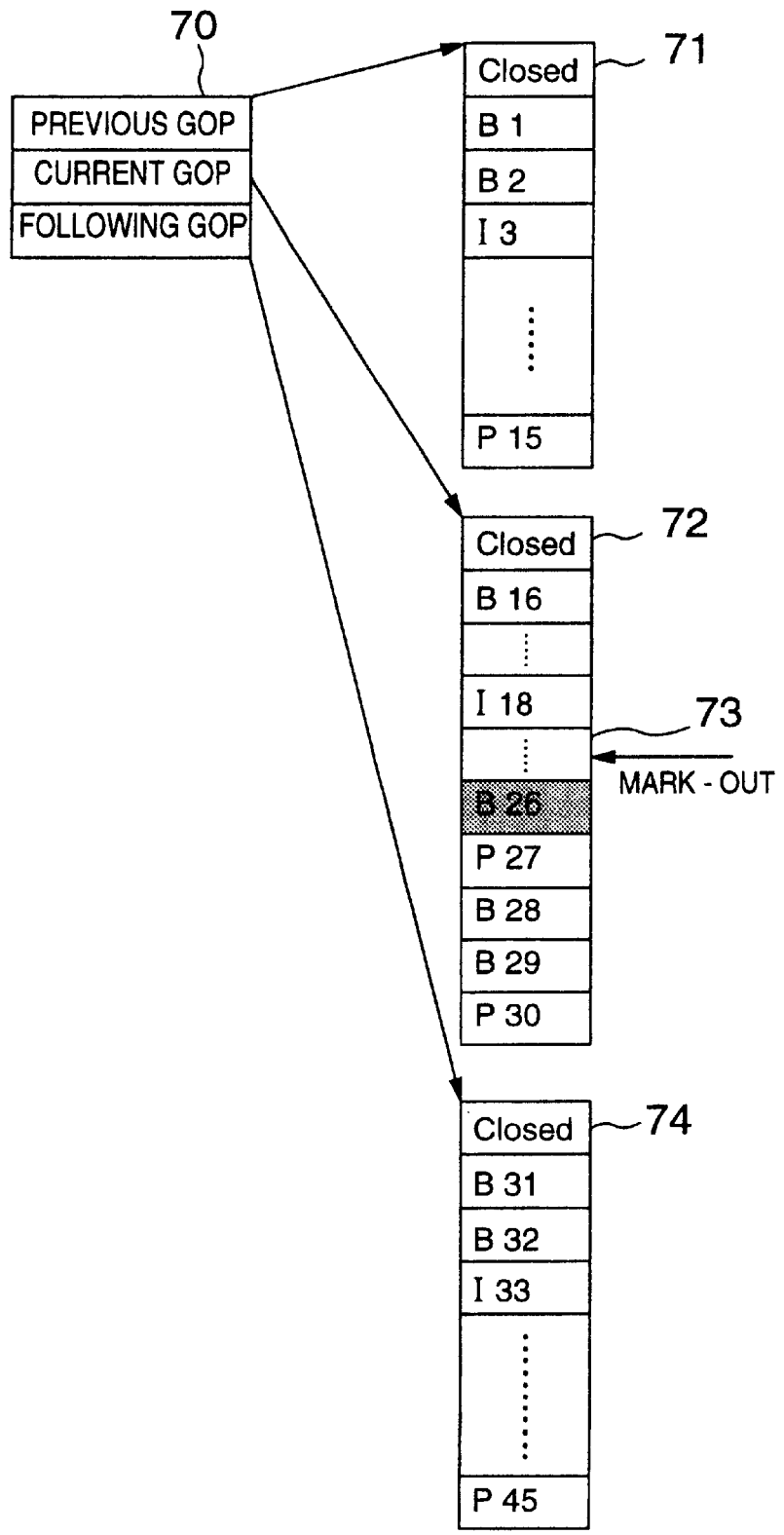
FIG. 7 is a diagram showing information for the designation-out of FIG. 10.

FIG. 7 shows an example of the previous and following GOP information for the mark-out in this embodiment. Referring to FIG. 7, there is shown a field 70 having the previous GOP, current GOP and following GOP of the mark-out, which hold picture information 71, 72, 74 with pictures arranged in the display order, respectively. In addition, it will be found that the specified mark-out B26 picture 73 is located the eleventh in the display order, and that the I18 picture and P27 picture lie before and after that picture, respectively. Thus, the mark-out position change is decided by use of these previous and following GOP information.

Referring back to FIG. 10, at step 1002 if the mark-out picture is decided to be the last picture within the GOP or of all pictures, or if the decision is Yes, the program goes to step 1004. At step 1004 that picture is made equal to the designation-out 26. If the mark-out picture is not the last picture, or if the decision is No, the program goes to step 1003, where the nearest I or P picture following the mark-out 25 is made coincident to the designation-out 26.

In this embodiment, since the B26 picture is the specified mark-out 25, the program goes to step 1002, and then to step 1003 because the mark-out is not the final picture. Thus, the following P27 picture is decided to be the designation-out 26, and the process ends.

In this way, the MPEG data sequence 23 specified at the mark-in 22 and mark-out 25 becomes data 27 that can be extracted without re-encoding. After the data 27 is extracted, it can be stuck to other compressed video data or only the data 27 can be reproduced. When the data is stored as a file, it is stored as data train 200 in which the pictures are arranged in the order of storing.

The process of editing the video stream has been described above. The process of editing the system stream will be described as another embodiment.

If the data is the system stream is decided from the information of the input file type at step 42 in FIG. 4. Here, if it is the system stream, the video data is cut away at step 35 of the whole process flow shown in FIG. 3. Then, the audio data associated with the cut-away video data is extracted from the audio stream by an additional step. The audio data extracting process will not be described here because it is not the main feature of the invention.

In the editing method of the above embodiment mentioned above, fifteen pictures are included in each GOP, and encoded in an arrangement of IBBP, and each picture is of the enclosed GOP. However, according to the principle of the invention, it is of course possible to edit without re-encoding irrespective of the number of pictures within each GOP, picture arrangement and closed GOP.

Although preferred embodiments of the invention have been described in detail, the invention is not limited to the above embodiments, but can be changed and modified without departing from the scope of the invention. While in the above-described embodiments the apparatus is of local architecture, and the processor extracts coded picture information, it can be considered to use an LSI having the video editing function or other information processor connected to networks.

While the architecture mentioned above can be considered to particularly satisfactorily function, other architectures may be used to achieve the same function. Therefore, the above-mentioned embodiments are only examples, and do not limit the invention. The present invention is not limited to the embodiments above described in detail, but can be modified within the scope of claims of the invention.

What is claimed is:

1. A method of editing encoded video information, comprising the steps of:
    specifying a proposed start picture of encoded video information being extracted;
    specifying a proposed end picture of said encoded video information being extracted;
    deciding if said proposed start and end pictures are encoded by referring to outside encoded video information that is out of the range from said proposed start picture to said proposed end picture;
    determining said outside encoded video information as an editing start picture if said proposed start picture is encoded by referring to said outside encoded video information;
    determining said outside encoded video information as an editing end picture if said proposed end picture is encoded by referring to said outside encoded video information; and
    editing encoded video information corresponding to the range from said determined editing start picture to said determined editing end picture.

2. A method according to claim 1, further comprising the step of determining a range of encoded audio information associated with said encoded video information to be edited as the range corresponding to that between said editing start and end pictures, said encoded audio information being edited as said encoded video information are edited.

3. A method according to claim 2, wherein said encoded video information to be edited is MPEG data.

4. A method of editing encoded video information having a plurality of pictures encoded, comprising the steps of:
    specifying a mark-in picture and mark-out picture corresponding to a start position and end position of a range of encoded video information to be edited; and
    changing said start position or end position from said mark-in or mark-out picture to an outside picture if said mark-in or mark-out picture is encoded by referring to said outside picture that is out of said range being edited.

5. A system for editing encoded video information comprising:
    an editing processor for editing said encoded video information;
    first storage means for storing said encoded video information;
    an input unit for inputting proposed editing start and end positions of said encoded video information; and
    second storage means for storing information of said proposed editing start and end positions;
    said editing processor being operated to decide if the encoded picture at said proposed editing start or end position is encoded by referring to outside video information that is out of the range between said proposed editing start and end positions, and if said proposed editing start or end position picture is encoded by referring to said outside video information, to change said proposed start or end picture to said outside video information for a definite editing start or end position, then editing being performed for said decisive video information range.

6. A system according to claim 5, further comprising a display for displaying guide information that is useful for specifying editing positions in said encoded video information.

7. A system for editing encoded video information comprising:
    an input unit for input ting a range of said encoded video information to be edited;
    a memory for storing information of editing said encoded video information; and
    a processor for editing said encoded video information;
    said processor being operated to search outside encoded video information that is out of said inputted editing range in order to detect encoded video reference information which is used to encode, by referring, an encoded picture corresponding to a start position or end position of said inputted editing range, and to change said start or end position to the position of said reference information for said inputted editing range.

8. A system according to claim 7, wherein said information to be edited includes said encoded video information and said specified range of information.

9. A system according to claim 7, further comprising a display for displaying guide information that is useful for specifying editing positions.

10. A system according to claim 9, wherein said editing position specifying guide information includes information of time associated with the whole time of said encoded video information and with said inputted editing range.

11. A system according to claim 9, wherein said editing position specifying guide information is video information that results from expanding said encoded video information.

12. A recording medium having a program stored to be read by a computer, said program being provided for use in editing encoded video information, and comprising the steps of:
    specifying a proposed encoded picture from which editing starts;
    specifying a proposed encoded picture at which editing ends;
    deciding if said proposed editing start and end picture are encoded by referring to outside video information that is out of said range defined by said proposed editing start and end pictures;
    detecting said outside video information if said proposed editing start and end pictures are decided to be encoded by referring to said outside video information; and changing the position of said proposed editing start or end picture to that of said outside video information to decide a new range to be edited.

13. A method of editing compressed moving picture data that is composed of a plurality of first-type compressed frame pictures capable of being independently expanded, and a plurality of second-type compressed frame pictures capable of being expanded by referring to other pictures, comprising the steps of:

fixing a picture block having compressed pictures arranged in the order of displaying with extraction start and end pictures specified from said compressed moving picture data stored in a memory;

deciding if said second-type compressed pictures within said picture block include a picture required to be expanded by referring to an outside compressed picture that is out of the range of said picture block; and reading said outside compressed picture from said memory if it is decided that there is a reference picture to be used for the expansion, and generating compressed moving picture data to be edited that is composed of said read picture and said compressed pictures within said picture block.

14. A method according to claim 13, wherein said first-type compressed pictures are intrapicture-compressed pictures of MPEG (Moving Picture Experts Group) standard, and each of said second-type compressed pictures is either previous prediction compressed picture or both-direction prediction compressed picture of said MPEG standard.

15. A method according to claim 14, wherein said outside reference picture out of said picture block is an intrapicture-compressed picture immediately before said picture block when the compressed pictures within said compressed moving picture data are arranged in the order of displaying.

16. A method according to claim 14, wherein said outside reference picture out of said picture block is an intrapicture-compressed picture or previous prediction compressed picture immediately after said picture block when the compressed pictures within said compressed moving picture data are arranged in the order of displaying.

17. A system for editing compressed moving picture data that is composed of a plurality of first-type compressed frame pictures capable of being independently expanded, and a plurality of second-type compressed frame pictures capable of being expanded by referring to other pictures, comprising:

a memory for storing said compressed moving picture data;

a display for displaying reproduced moving pictures of said compressed moving picture data;

a processing unit for fixing a picture block having compressed pictures arranged in the order of displaying with extraction start and end pictures specified from said compressed moving picture data stored in a memory;

a processing unit for deciding if said second-type compressed pictures within said picture block include a picture required to be expanded by referring to an outside compressed picture that is out of the range of said picture block; and a processing unit for reading said outside compressed picture from said memory if it is decided that there is a reference picture to be used for the expansion, and generating compressed moving picture data to be edited that is composed of said read picture and said compressed pictures within said picture block.

18. A system according to claim 17, wherein said first-type compressed pictures are intrapicture-compressed pictures of MPEG (Moving Picture Experts Group) standard, and each of said second-type compressed pictures is either previous prediction compressed picture or both-direction prediction compressed picture of said MPEG standard.

19. A system according to claim 18, wherein said outside reference picture out of said picture block is an intrapicture-compressed picture immediately before said picture block when the compressed pictures within said compressed moving picture data are arranged in the order of displaying.

20. A system according to claim 18, wherein said outside reference picture out of said picture block is an intrapicture-compressed picture or previous prediction compressed picture immediately after said picture block when the compressed pictures within said compressed moving picture data are arranged in the order of displaying.

21. A computer readable storage medium for use in a system for editing compressed moving picture data that is composed of a plurality of first-type compressed frame pictures capable of being independently expanded, and a plurality of second-type compressed frame pictures capable of being expanded by referring to other pictures, comprising:

a processing part for fixing a picture block having compressed pictures arranged in an order of displaying with extraction start and end pictures specified as opposite ends from said compressed moving picture data stored in a memory;

a processing part for deciding if said second-type compressed pictures within said picture block include a picture required to be expanded by referring to an outside compressed picture that is out of the range of said picture block; and a processing part for reading said outside compressed picture from said memory if it is decided that there is a reference picture to be used for the expansion, and generating compressed moving picture data to be edited that is composed of said read picture and said second-type compressed pictures within said picture block.

22. A method of editing moving picture data that is composed of a plurality of first-type pictures capable of being independently reproduced, and a plurality of second-type pictures capable of being reproduced by referring to other pictures, comprising the steps of:

fixing a picture block having pictures arranged in the order of displaying with extraction start and end pictures specified as opposite ends from said moving picture data stored in a memory;

deciding if said second-type pictures within said picture block include a picture required to be reproduced by referring to an outside picture that is out of a range of said picture block; and reading said outside picture from said memory if it is decided that there is a reference picture to be used for reproduction, and generating moving picture data to be edited that is composed of said read picture and said second-type pictures within said picture block.

* * * * *